United States Patent [19]
Lohmann et al.

[11] Patent Number: 5,821,411
[45] Date of Patent: Oct. 13, 1998

[54] METHOD FOR DETECTING COMBUSTION MISFIRES VIA A SEPARATE CLASSIFICATION OF INDIVIDUAL AND PERMANENT MISFIRES

[75] Inventors: Andrea Lohmann, Stuttgart; Klaus Ries-Müller, Bad Rappenau; Jürgen Förster, Chemnitz, all of Germany

[73] Assignee: Robert Bosch GmbH, Stuttgart, Germany

[21] Appl. No.: 717,900

[22] Filed: Sep. 23, 1996

[30] Foreign Application Priority Data

Sep. 21, 1995 [DE] Germany .................. 195 34 994.6

[51] Int. Cl.$^6$ ................... G01M 15/00; F02D 41/00
[52] U.S. Cl. .............. 73/116; 701/110; 123/419; 123/436
[58] Field of Search ................... 73/116, 117.2, 73/117.3; 123/419, 436; 701/101, 110, 111

[56] References Cited

U.S. PATENT DOCUMENTS 5,200,899  4/1993  Ribbens et al. ............. 364/431.08
5,239,473  8/1993  Ribbens et al. ............. 364/431.08

FOREIGN PATENT DOCUMENTS 4138765  7/1992  Germany .

*Primary Examiner*—George M. Dombroske
*Attorney, Agent, or Firm*—Walter Ottesen

[57] ABSTRACT

The invention is directed to a method for detecting combustion misfires on the basis of a first complex input feature signal wherein the nonuniformity of the rotational movement (on the basis of rpm or segment times) of the internal combustion engine is mapped within a first order defined by a rotation of the crankshaft through an angle of $720°/k$ wherein $k=1$. The input feature signal serves as a feature signal to detect recurring misfires and functions as a feature signal to detect sporadic misfires. The complex input signal is defined by a magnitude and a phase angle which vary as a function of time. The presence of a misfire is detected from the magnitude and the affected cylinder is determined from the phase angle.

19 Claims, 12 Drawing Sheets

METHOD FOR DETECTING COMBUSTION MISFIRES VIA A SEPARATE CLASSIFICATION OF INDIVIDUAL AND PERMANENT MISFIRES

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A detection system for combustion misfires includes the following function blocks: sensors, signal processing and feature extraction as well as classification (FIG. 1). The sensors detect, for example, segment times, that is, the time intervals in which the crankshaft passes through a predetermined rotational angle. Feature signals are formed from the segment times in the feature extraction block. The classification block follows the feature extraction block and combustion misfires are detected from the feature signals, for example, by threshold value comparisons or by utilizing a neural network or other known methods.

A system operating on the basis of threshold-value comparisons is already known and disclosed in German patent publication 4,138,765 which corresponds to U.S. patent application Ser. No. 07/818,884, filed Jan. 10, 1992, now abandoned.

In this known method, the segments are realized, for example, by markings on a transducer wheel coupled to the crankshaft. The segment time in which the crankshaft passes through this angle range is dependent, inter alia, upon the energy converted in the combustion stroke. Misfires lead to an increase of the ignition-synchronously detected segment times. Pursuant to the known method, a criterion for the rough running of the engine is computed from the differences of the segment times. In addition, slow dynamic operations such as the increase of the engine rpm for vehicle acceleration are mathematically compensated.

A rough-running value, which is computed in this way for each ignition, is likewise compared ignition-synchronously to a predetermined threshold value. Exceeding this threshold value is evaluated as a misfire. The threshold value is dependent, as may be required, from operating parameters such as load and engine speed (rpm). This method is then based on the feature extraction in the time range.

Additional methods are known from U.S. Pat. Nos. 5,200,899 and 5,239,473 wherein the transformation of rpm signals in the frequency range by means of discrete fourier transformations is used for feature extraction. The display of the results indicates a block-like application of the transformation to the rpm signals. A block is formed of, for example, m rpm signals. The m rpm signals are determined during a camshaft revolution. However, individual misfires are not optimally resolved in this way. In contrast, if the transformation is performed sequentially, that is, if the evaluation block of m rpm signals is shifted by less than a camshaft rotation, then disadvantages result with respect to the detection of permanent misfires.

The above methods define the results of a block-like analysis in the frequency range and do not consider the further evaluation of the features obtained.

In contrast to the above, the invention includes a complete classification system for combustion misfires. The system is based upon a feature signal which is obtained by evaluating the rpm fluctuations utilizing signal modulation. Obtaining such a feature signal is disclosed in U.S. patent application Ser. No. 08/705,146, filed Aug. 29, 1996, which is incorporated herein by reference.

Briefly summarized, this patent application discloses a method for detecting combustion misfires which operates on the basis of a first signal in which the nonuniformity of the rotational movement of the crankshaft of the engine is mapped and wherein a second signal is generated which is periodical and which has a period duration which corresponds to the period duration of a work cycle of the engine or this period duration divided a whole number k. The method also has a fixed phase relationship to the rotational movement of the crankshaft and the second signal is modulated by a signal based on the first signal and filtered. Also in the method, the modulated third signal, which results from the modulation and filtering, is used to detect combustion misfires and to identify the affected cylinder. The third signal defines an input feature signal with reference to the next-following classification stage wherein the nonuniformity of the rotational movement of the crankshaft of the engine is mapped in the k-th order. In the following, k=1 so that the third signal represents especially the portion of the first signal occurring with the camshaft frequency and which is characteristic for misfires.

The feature signal obtained in this way includes frequency data as well as time-range data whereby the signal-to-noise ratio for the next-following classification stages is significantly increased.

SUMMARY OF THE INVENTION

The essence of the invention concerns the classification, namely, the detection of the combustion misfires as well as the identification of the affected cylinder. In this connection, it is an object of the invention to make possible a reliable detection of combustion misfires especially in the critical range of low loads for high rpm and for a high number of cylinders.

The method of the invention is for detecting combustion misfires in an internal combustion engine on the basis of a first complex input feature signal. The method includes the steps of defining the nonuniformity of the rotational movement of the engine on the basis of rpm or segment times; mapping the nonuniformity within a first order defined by a rotation of the crankshaft of the engine through an angle of 720°/k wherein k=1; the first complex input An advantage of the invention is that the frequency and time range data is evaluated with this data being available in the feature signal utilized for evaluation. In this way, the signal-to-noise ratio is significantly increased.

The separation of the evaluation of permanent and individual misfires makes possible a significant improvement of the reliability of detection by the following:

(a) reference signal subtraction;
(b) different degree of filtering;
(c) different filter lengths; and,
(d) additional phase discrimination for individual misfires.

Further general advantages are:

(a) reliable detection of combustion misfires at high rpm, low loads and a high number of cylinders; and,
(b) reliable cylinder identification.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
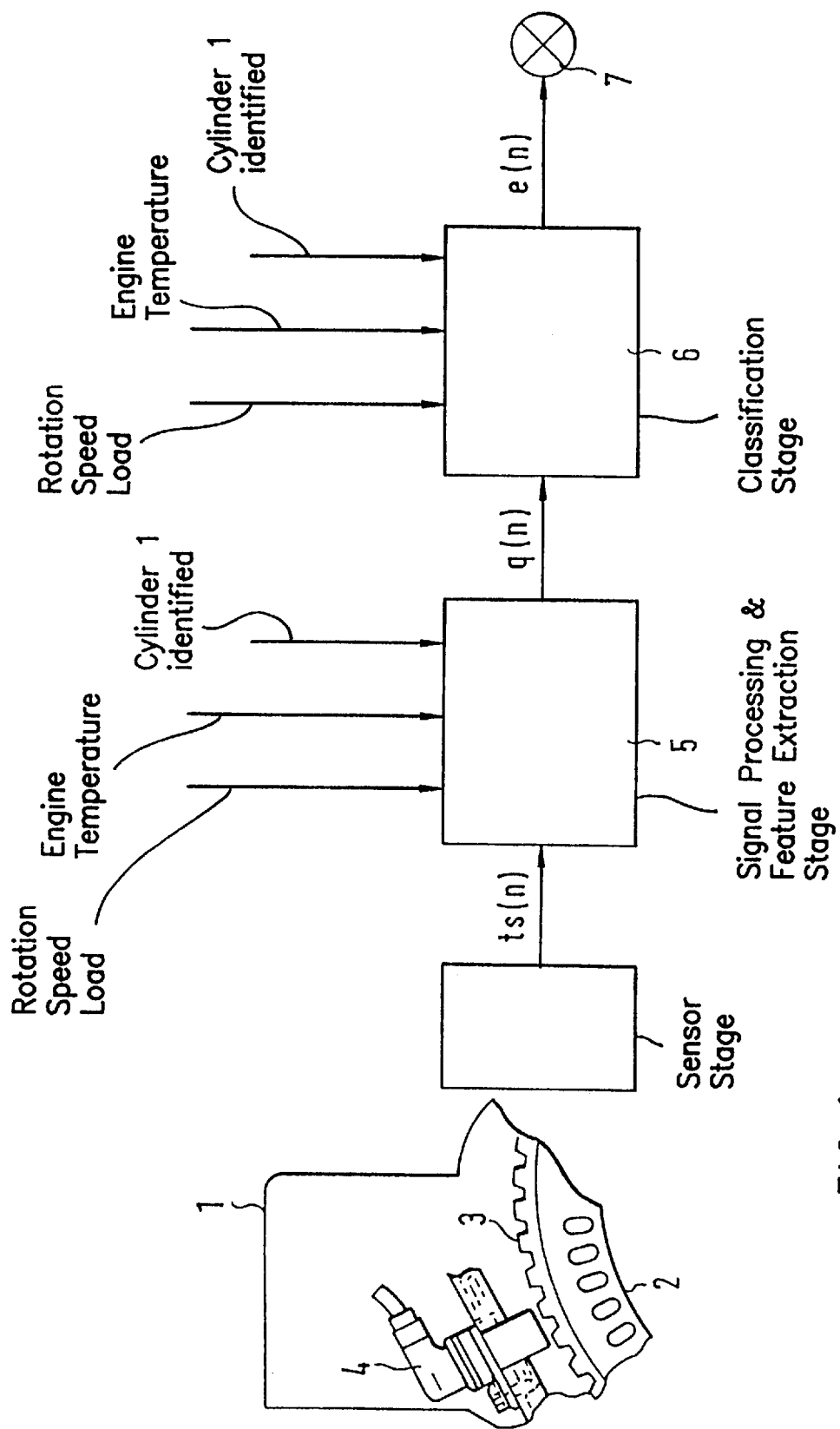
FIG. 1 is a schematic representation of a recognition system for misfire detection to show the setting in which the method of the invention is applied.

FIG. 1 shows an internal combustion engine 1 equipped with a sensor comprising an angle transducer wheel 2 having markings 3 and an angle sensor 4 as well as a block 5 symbolizing the feature extraction, a block 6 symbolizing the classification and a device 7 for displaying the occurrence of combustion misfires. The angle transducer wheel is coupled to the crankshaft of the engine and the rotational movement thereof is converted into an electrical signal with the aid of the angle sensor 4 in the form of an inductive sensor. The periodicity of the electrical signal defines an image of the passing of the markings 3 at the angle sensor 4. The time duration between a rise and a fall of the signal level therefore corresponds to the time in which the crankshaft has rotated farther beyond an angular range corresponding to the extent of a marking.

The segment times are further processed in the following stages.

Figure 2:
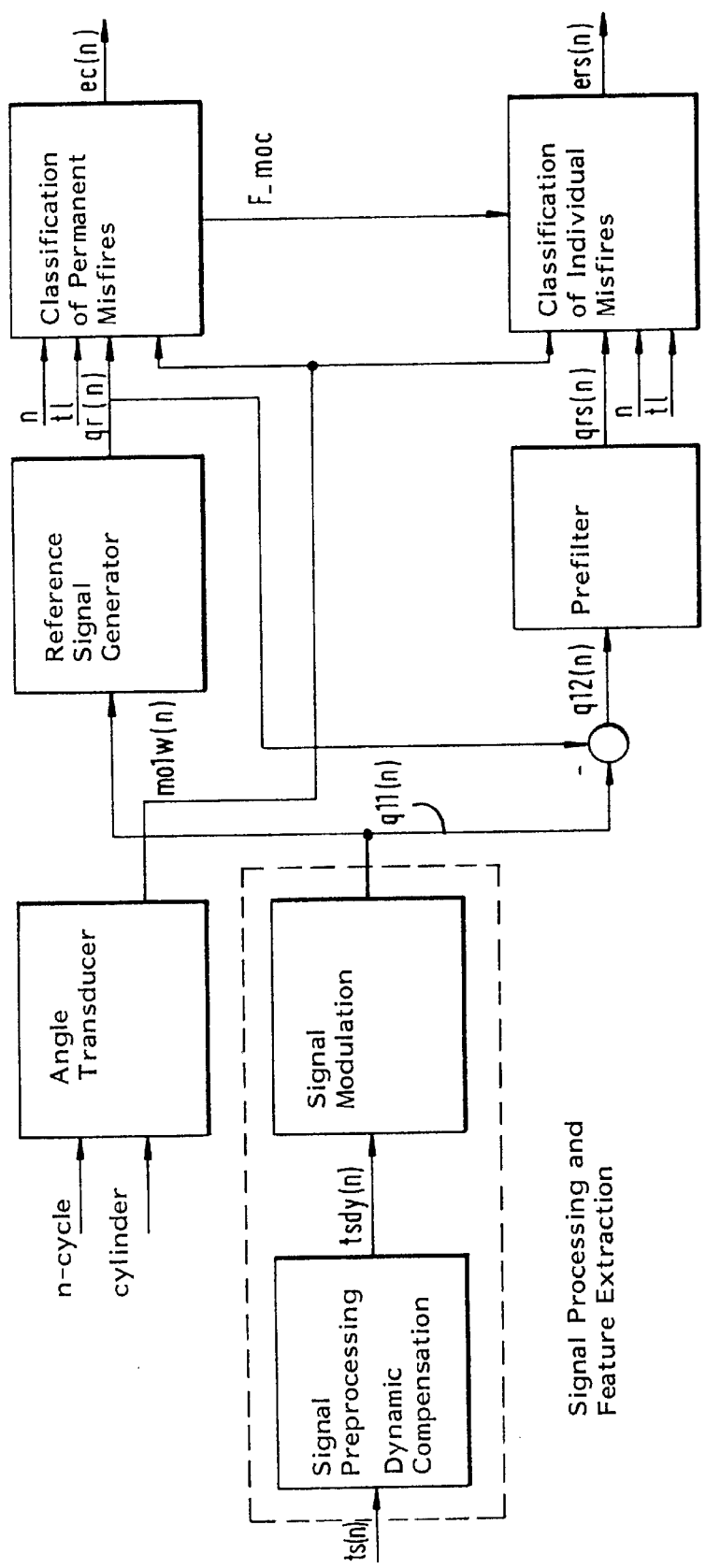
FIG. 2 is a function block diagram.

In FIG. 2, the sensor signal ts(n) is applied to the input of the signal-processing and feature-extraction stage. Within this stage, a signal processing takes place via dynamic compensation. The signal modulation stage functions to extract the feature signal q11(n) which is assigned to the first order.

Figure 3:
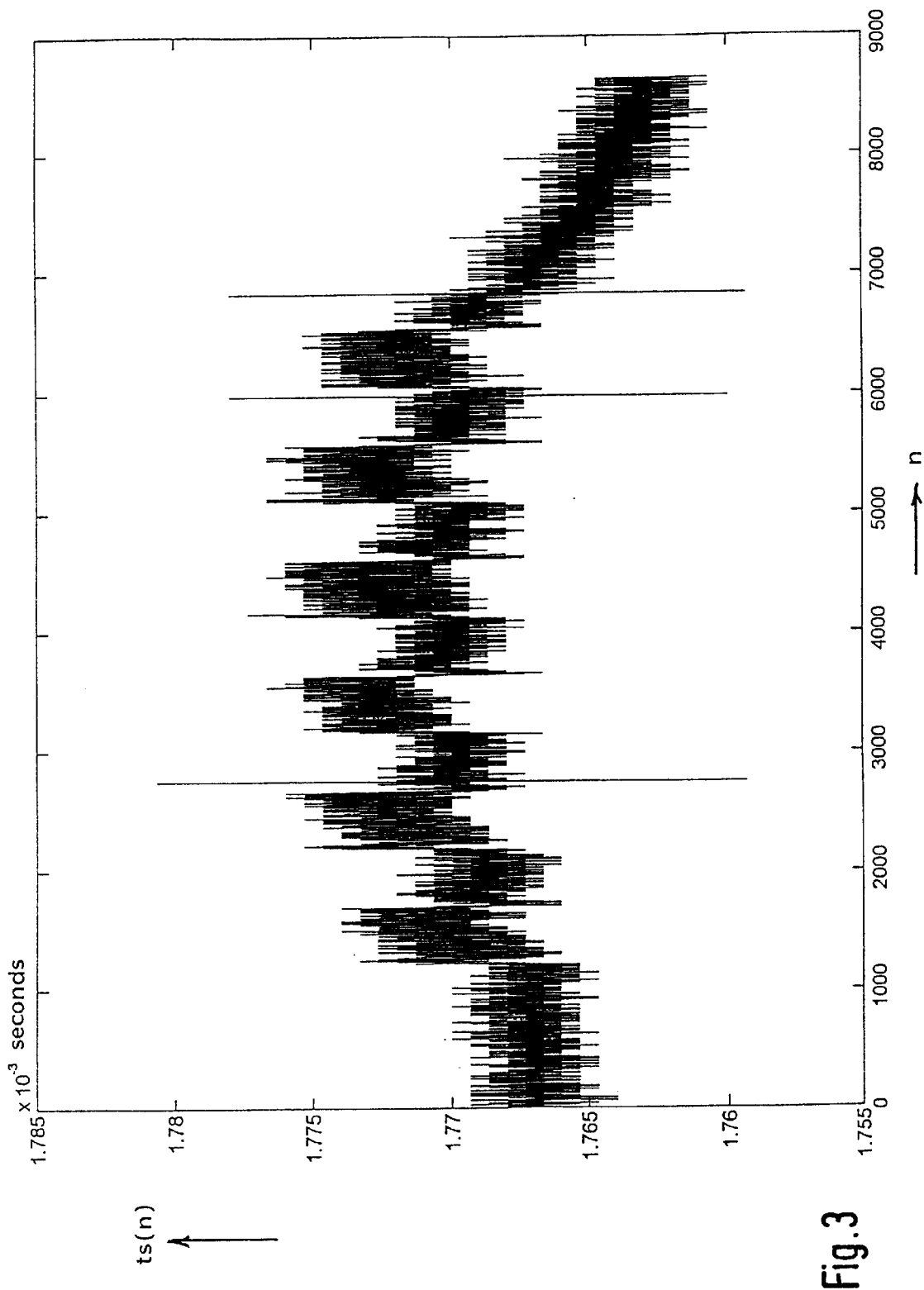
FIGS. 3 and 4 each show a typical input signal ts(n) of the feature extraction stage with permanent (recurring) and individual (sporadic) misfires for a twelve cylinder engine.
Figure 4:
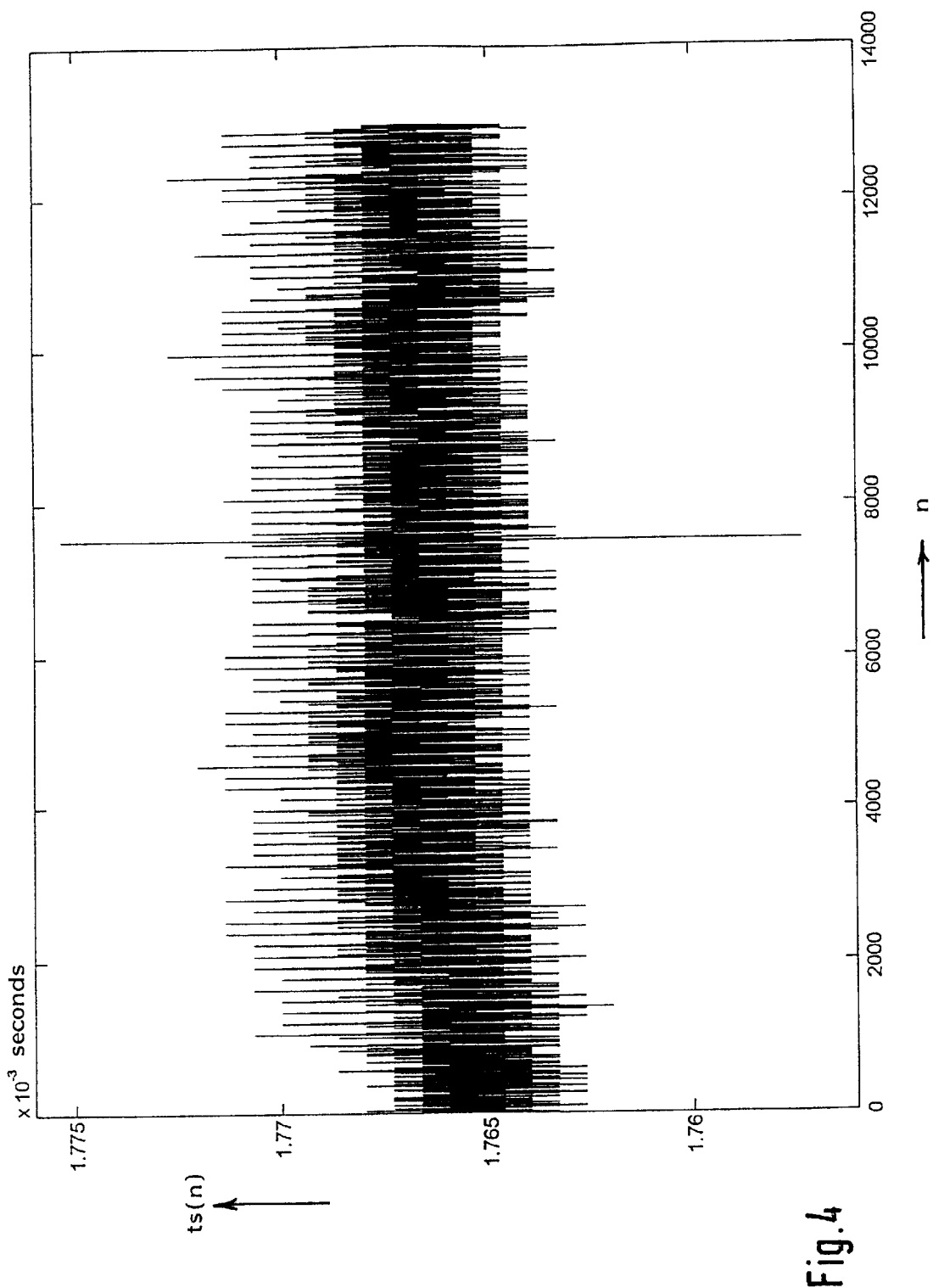

FIGS. 3 and 4 each show a typical input signal ts(n) with permanent and individual misfires for a twelve cylinder engine at 5600 rpm and 32% load. The low signal-to-noise ratio of the signal is apparent.

Figure 5:
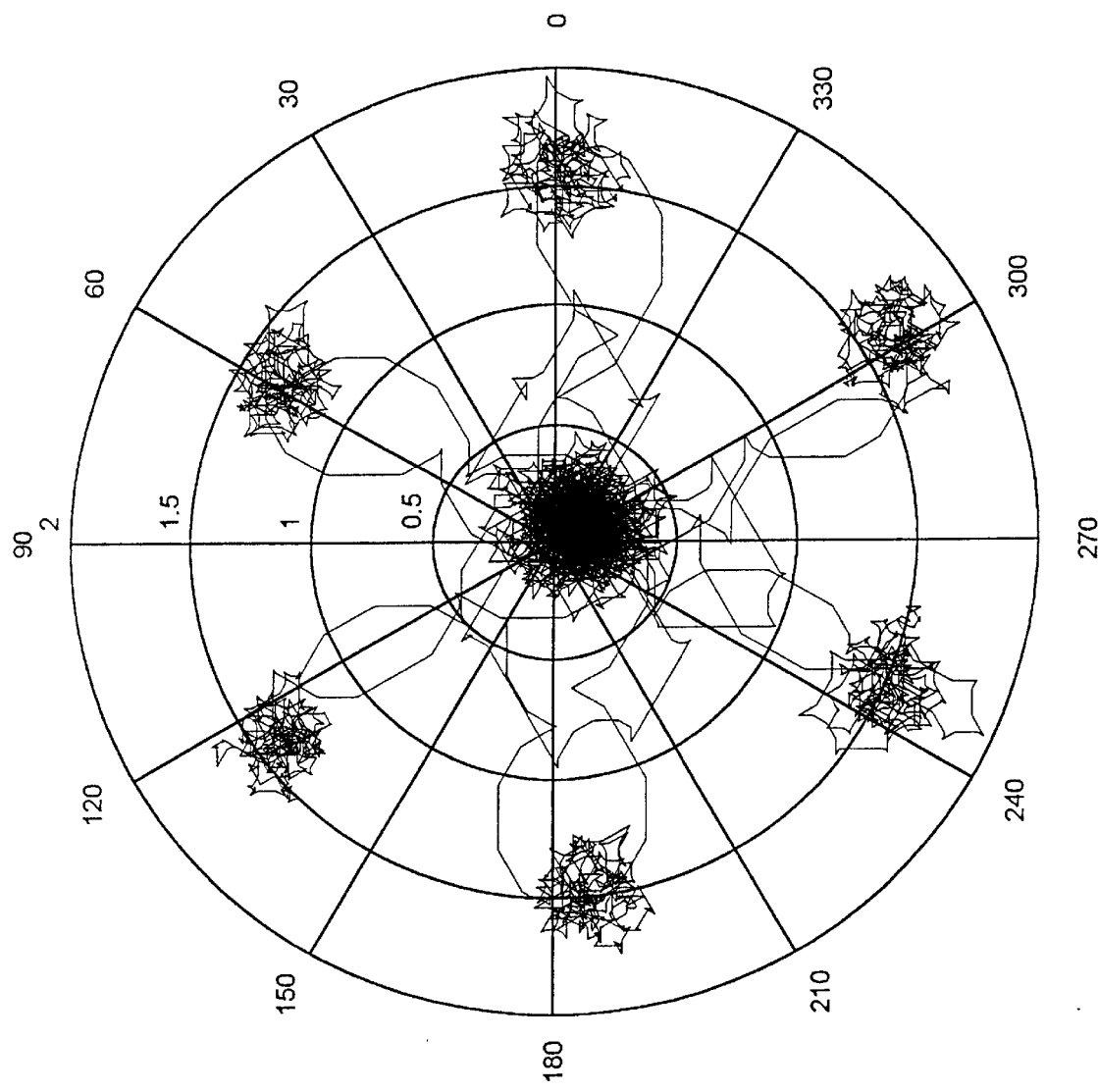
FIGS. 5 and 6 show the characteristics of the feature signal q11(n) which is supplied to the classification for permanent and individual misfires.
Figure 6:
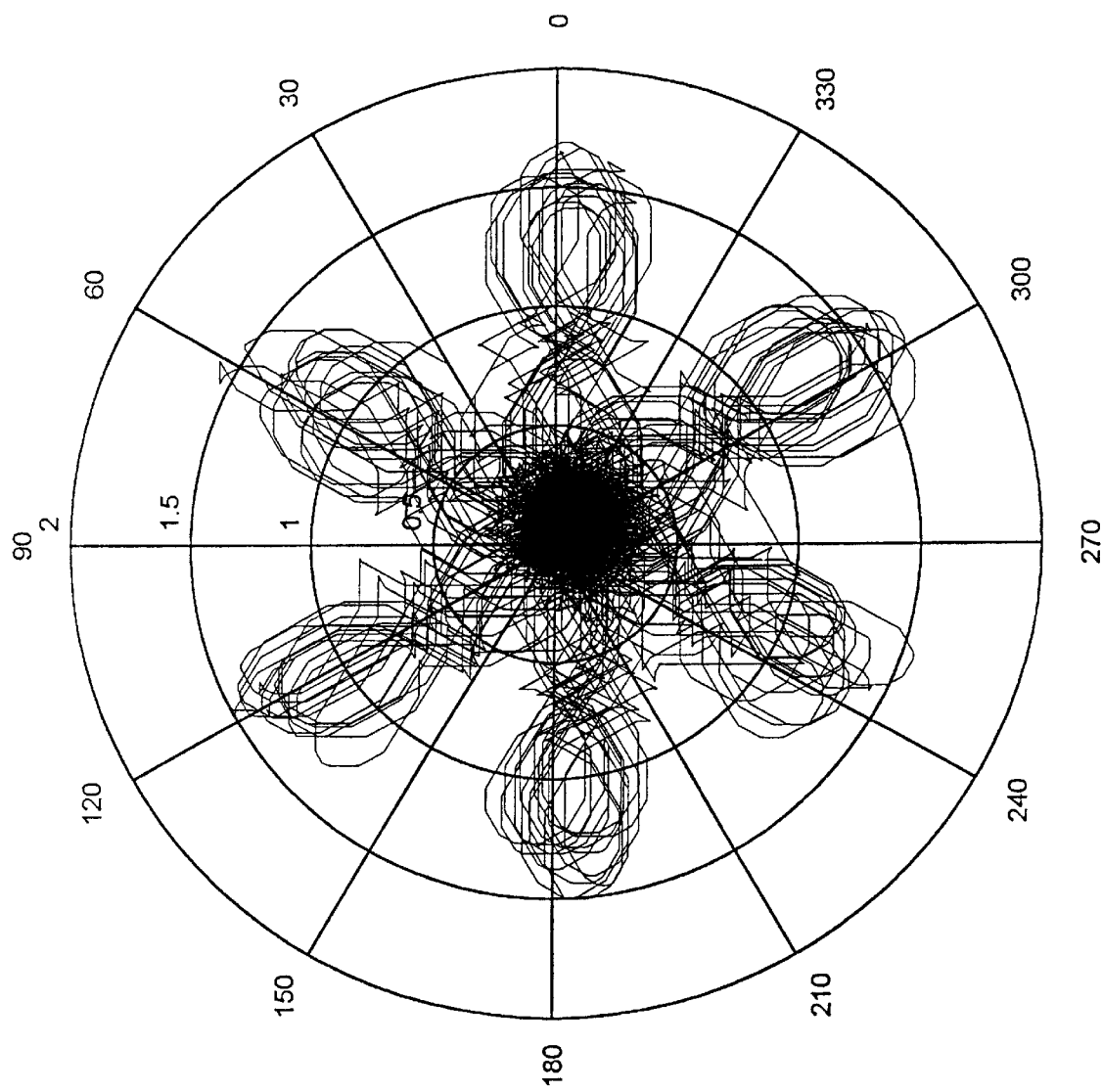

FIGS. 5 and 6 are exemplary of the characteristics of the feature signal q11(n) for permanent or individual misfires with respect to measurement curves as they are detected in a realization of the method of the invention. Respective paths are shown, that is, the time-dependent trace of a feature signal q11 in polar coordinates, that is, with magnitude and phase angle. The feature point then moves primarily in the proximity of the center point (normal class), that is, with a small magnitude and randomly distributed phase angle as it corresponds to a misfire-free operation.

For an individual misfire, the point jumps into another region (class) which is spaced by a certain amount from the center point and has a comparatively sharply defined phase. From FIG. 5, it is clear that even an individual misfire can be detected with the aid of the invention and assigned to a cylinder. FIG. 5 correspondingly shows the conditions for permanent misfires in different cylinders. It is clear that feature points of misfires in different cylinders concentrate in regions (classes) of the coordinate measuring system, which are clearly distinguishable from each other, and the feature points can therefore be distinguished from each other.

Stated simply, the feature signal q11(n) has the following characteristics:

(a) concentrated class spaces for permanent misfires;
(b) distinguishable trajectories for individual misfires of different cylinders;
(c) different amplitudes and phase positions of individual and permanent misfires for a cylinder;
(d) space between coordinate origin and normal class as a consequence of torsion vibrations;
(e) individual misfires can, as shown, land in the normal class as well as also in permanent misfire classes; and,
(f) the transition from the normal class to the permanent misfire class and the jump back correspond each to half of the signal trace of an individual misfire.

The feature signal q11(n) passes through the reference signal generator which is essential to the invention. This generator is characterized in that the reference signal corresponds to the lowpass-filtered input signal for small signal changes of the input feature signal and in that the reference signal is frozen for large signal changes until small signal changes again occur.

Figure 7:
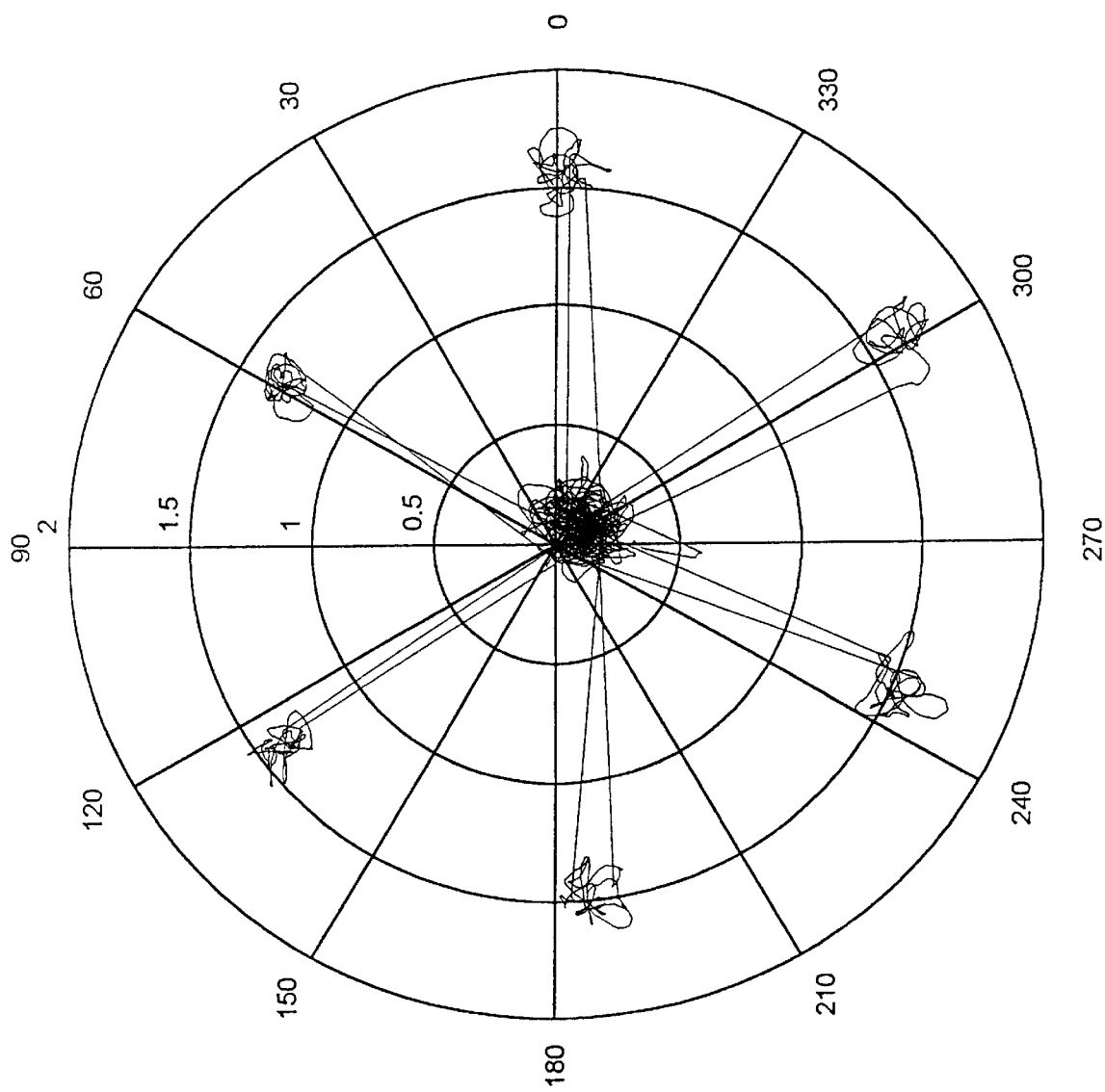
FIG. 7 is a schematic of the reference signal qr(n)

The reference signal qr(n) is shown in FIG. 7. The class spaces are substantially more compact as a consequence of the lowpass-filter action. The nonlinear performance of the reference signal generator effects sharper crossovers between the classes.

Figure 8:
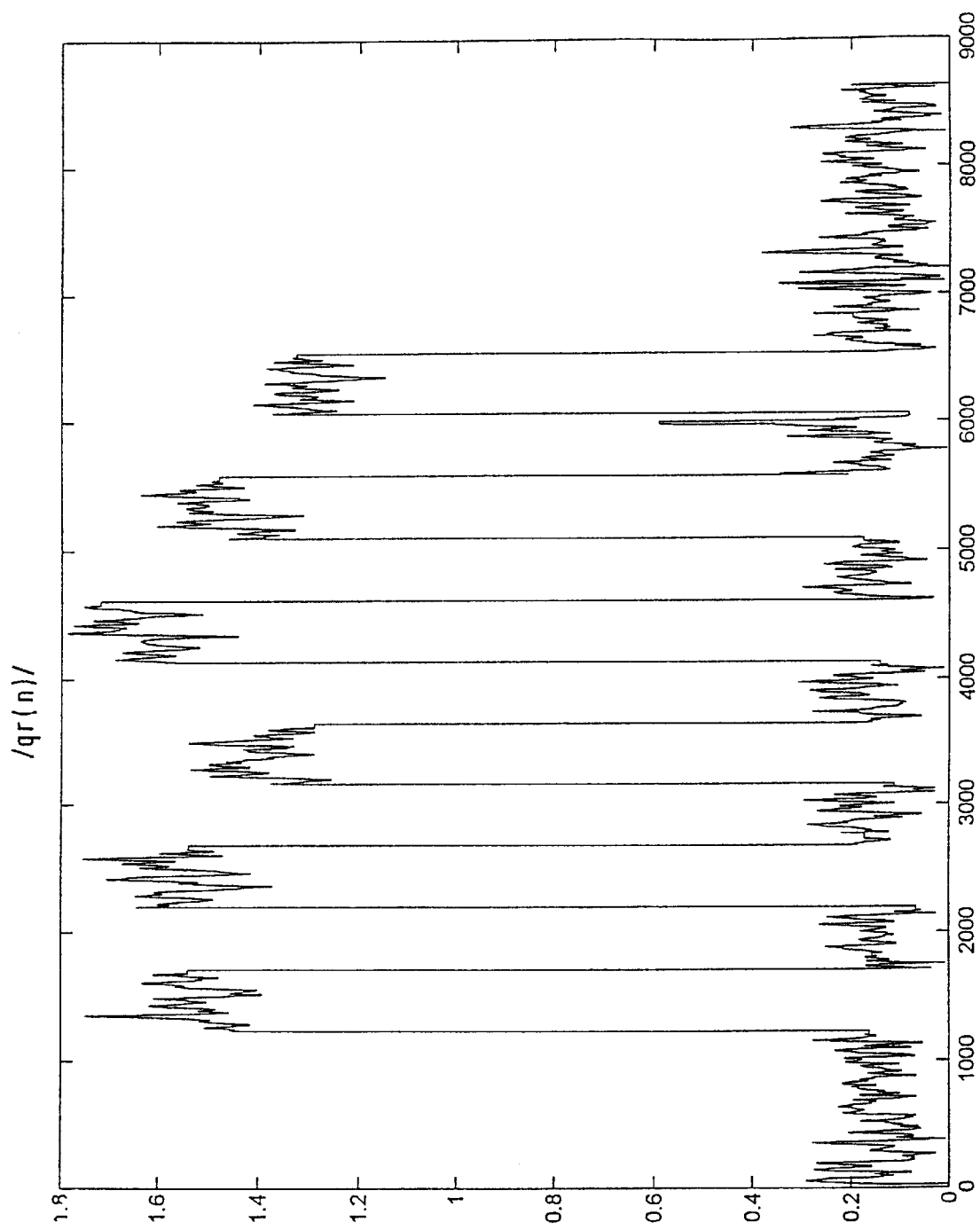
FIG. 8 shows the trace of the magnitude |qr(n)| of the reference signal.

The reference signal is connected to the classification stage for permanent misfires. The trace of the magnitude of the reference signal (FIG. 8) functions to detect permanent misfires via a threshold value comparison. A conclusion is drawn as to the misfiring cylinder from the phase. Magnitude and phase threshold values can be characteristic-field dependent.

Figure 9:
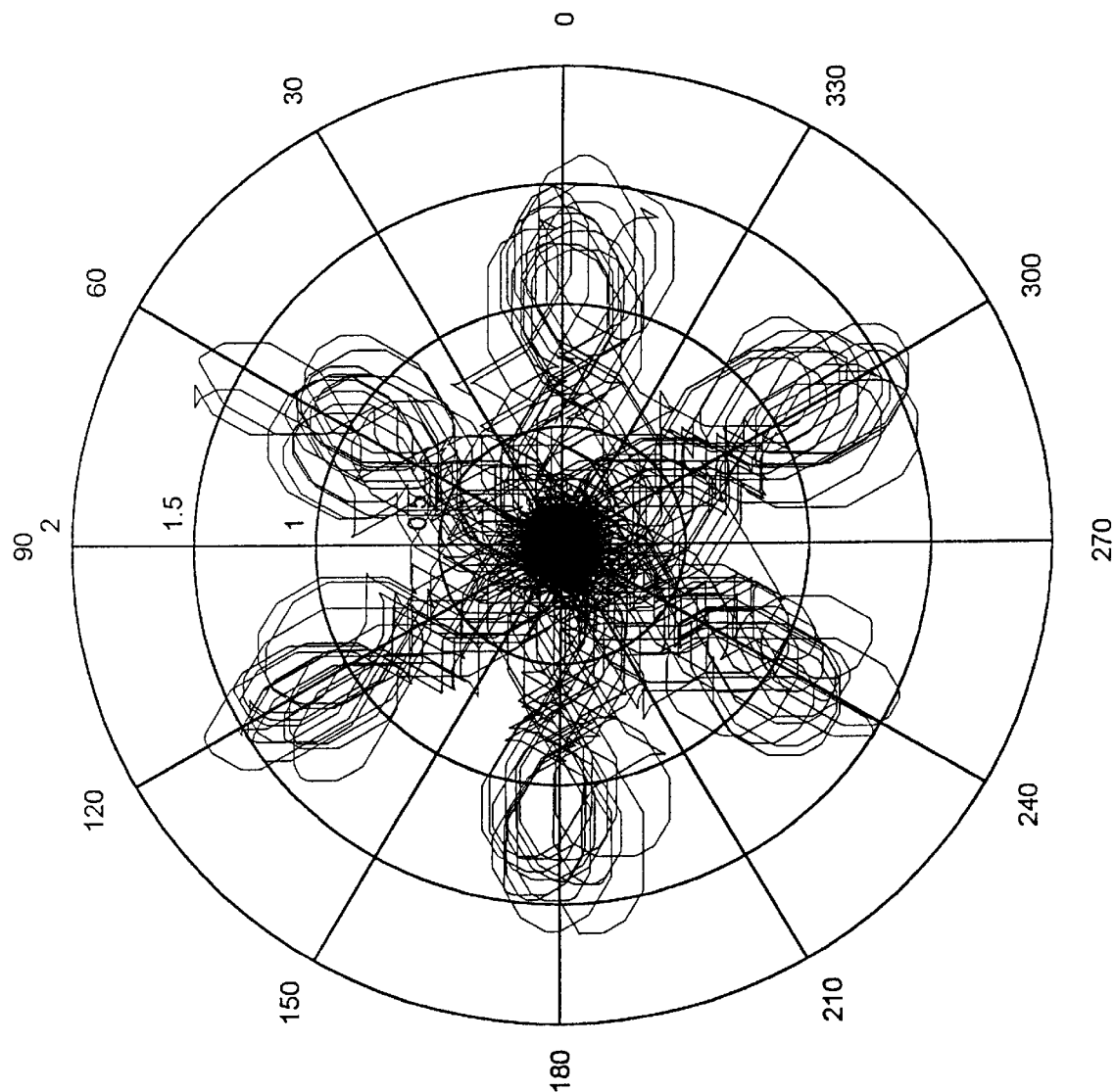
FIG. 9 shows a signal as it is used according to the invention on the path to detecting individual misfires.

FIG. 9 shows the feature signal q12(n). As a consequence of the reference signal subtraction, the reference class (misfire-free normal class or a permanent misfire class) is always in the coordinate origin.

Figure 10:
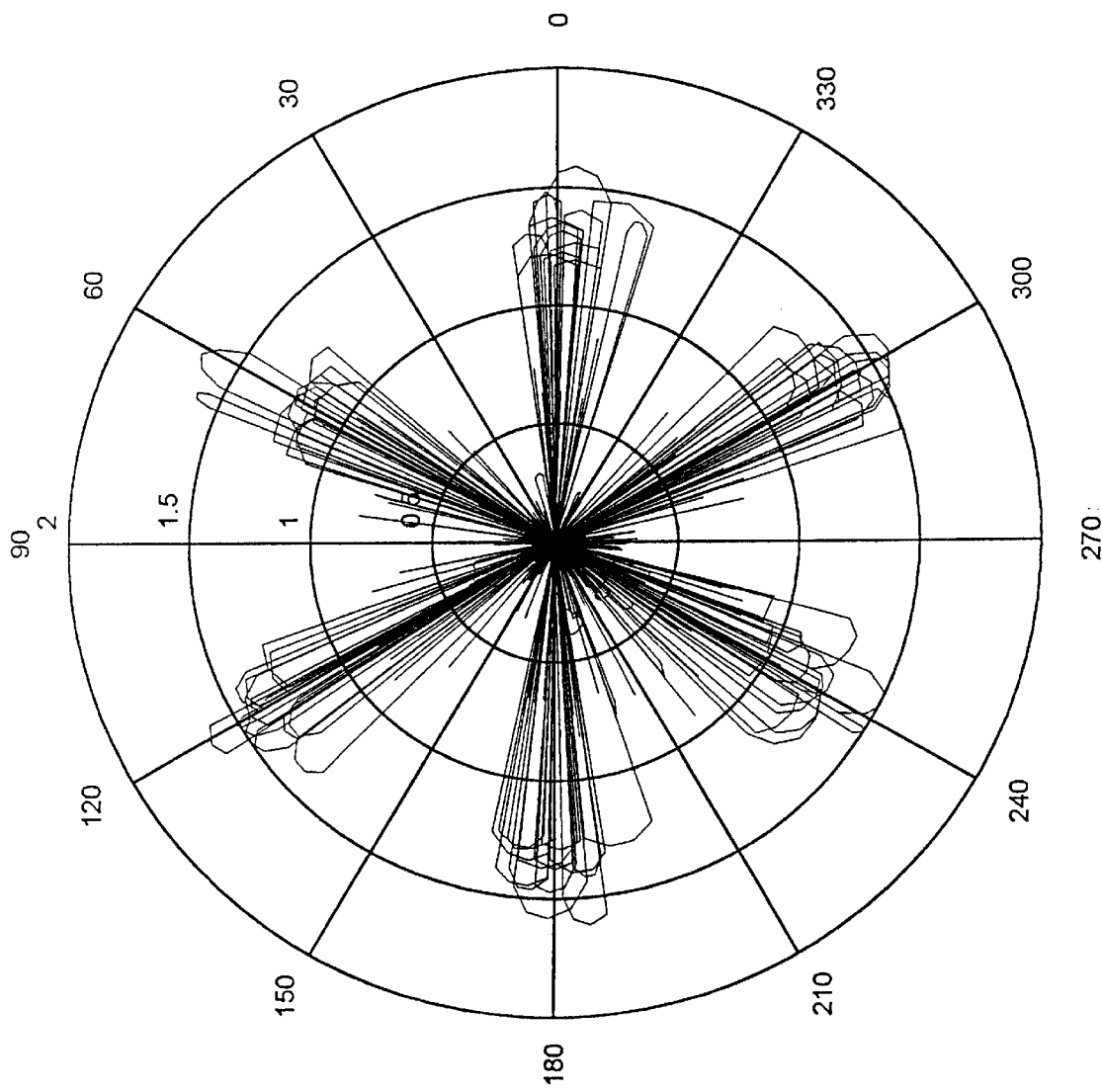
FIG. 10 shows the signal of FIG. 9 further processed.

A prefilter is located in the path of the feature signal for detecting individual misfires. This prefilter is characterized in that a derivative signal qrs(n) for detecting individual misfires is formed within a moving window and in that this derivative signal is set to zero when the signal values exceed a specific spacing to the mean value within the window. The characteristics of this signal (FIG. 10) can be derived from the comparison to FIG. 9. The scattering or distribution of the signal values (spacing of values along radii to the center point of FIG. 9) and the phase ranges (angular range within which the scattered values occur) are less during the individual misfires as a consequence of the lowpass-filter action. The nonlinear performance of the prefilter effects steep crossovers between reference class and individual misfires.

Figure 11:
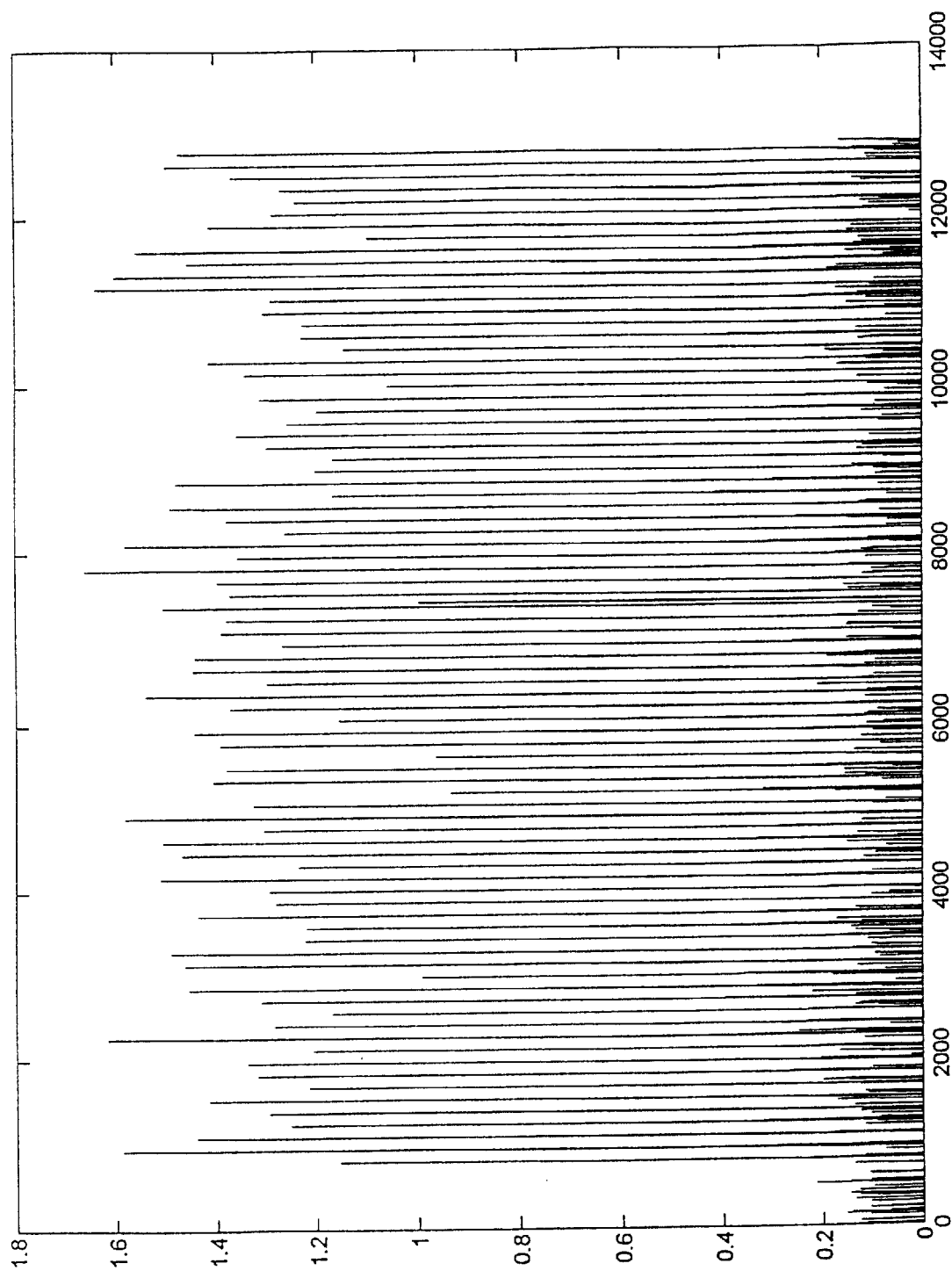
FIG. 11 shows the magnitude of the signal of FIG. 10.

The magnitude of qrs(n) shown in FIG. 11 permits an excellent signal-to-noise ratio to be recognized on average.

Figure 12:
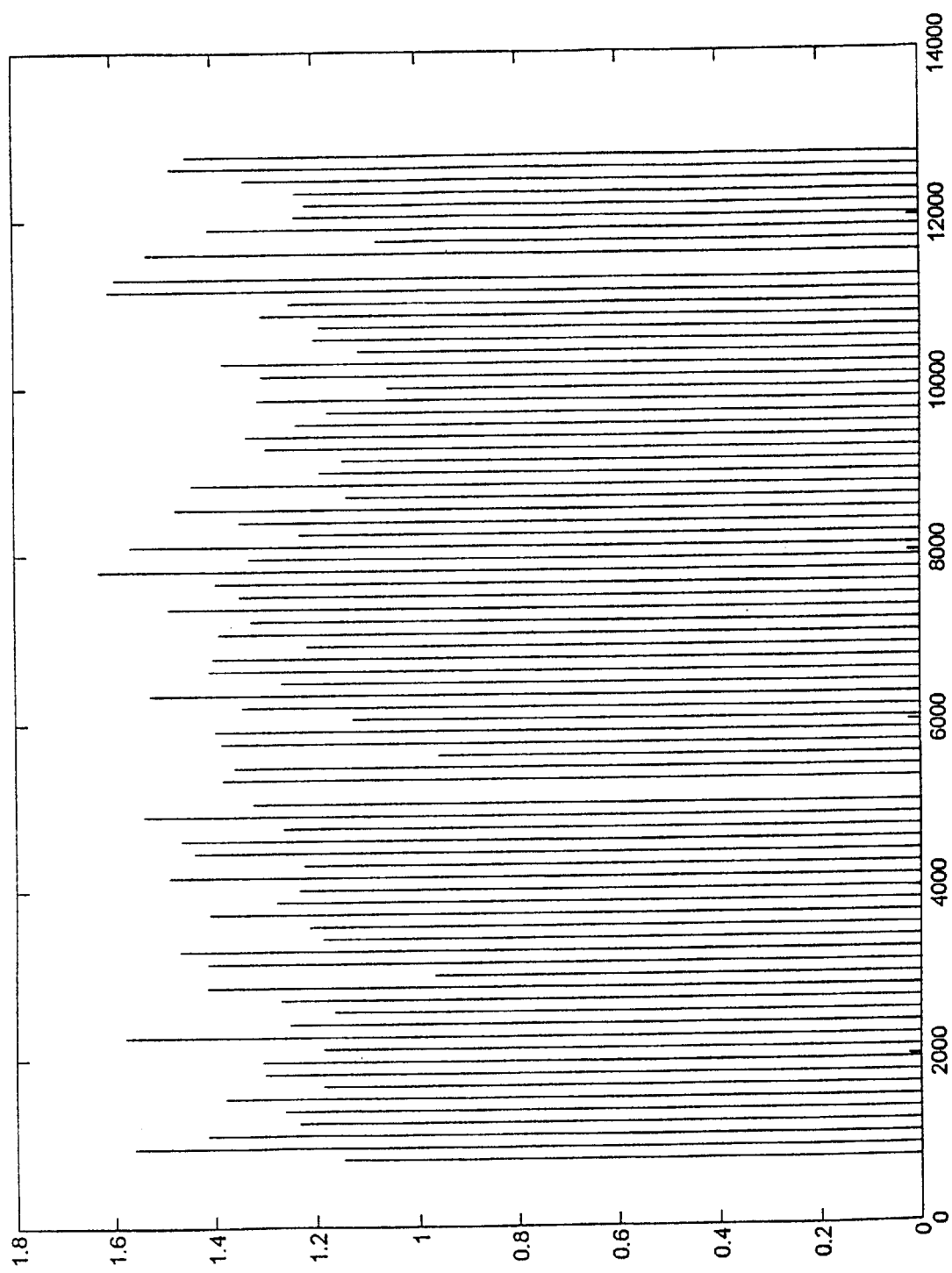
FIG. 12 shows a signal obtained via phase discrimination from the signal of FIG. 11.

This signal is subjected to a phase discrimination in the block for classification of individual misfires. The feature signal can only then represent an individual misfire when the phase thereof has not exceeded a range assigned to the actual igniting cylinder. For this reason, the feature signal is set to zero in the opposite case. The characteristics of this signal are shown in FIG. 12 and can be derived from the comparison with FIG. 11. A further intense disturbance component reduction is apparent and a few misfires can also be suppressed.

In the block for classification of individual misfires, a conclusion is furthermore drawn as to the occurrence of combustion misfires from the magnitude of the feature signal and a conclusion is drawn as to the affected cylinder from the phase. Magnitude and phase can be characteristic-field dependent.

From the signal characteristics, it is known that the signal traces of the feature q11(n) are very similar to an individual misfire when there is a change of state between the normal misfire class and the permanent misfire class. Accordingly, a trigger bit F_moc is generated in the block to detect permanent misfires when there is a change of state. In the block for detecting individual misfires, this bit causes a subsequent cancellation of already detected individual misfires in this region.

In the block for evaluating the decision signals ec(n) and ers(n), a signal to drive the fault lamp can be generated. These decision signals ec(n) and ers(n) contain the data as to detected permanent and individual misfires.

In FIG. 2, the block "angle clock" is also provided. This block generates a phase signal w1(n) from the synchro stroke and the cylinder-1 bit. This phase signal runs through 360° per complete work cycle of the engine. This signal functions for phase discrimination and cylinder identification in the classification blocks.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in an internal combustion engine on the basis of a first complex input feature signal, said engine having a crankshaft and the method comprising:

defining the nonuniformity of the rotational movement of said engine on the basis of rpm or segment times;

mapping said nonuniformity within a first order defined by a rotation of said crankshaft through an angle of 720°/k wherein k=1;

said first complex input feature signal operating as a feature signal to detect recurring misfires and as a feature signal to detect sporadic misfires; and, said first complex input signal being defined by a magnitude and a phase angle which vary as a function of time.

2. The method of claim 1, comprising the further steps of drawing a conclusion as to a recurring misfire from said magnitude and drawing a conclusion as to the affected cylinder from said phase angle.

3. The method of claim 1, further comprising the step of forming a derived signal to detect sporadic misfires from said feature signal to detect individual misfires by forming a mean value within a moving window; and, setting the derived signal to zero when the value of said signal within said window exceeds a specific spacing to said mean value.

4. The method of claim 1, wherein said feature signal for sporadic misfires or a signal derived therefrom can only represent a sporadic misfire when the phase angle of said signal does not move out of a region assigned to the actual firing cylinder (phase angle discrimination).

5. The method of claim 1, comprising the further steps of drawing a conclusion as to the occurrence of combustion misfires from the magnitude of said feature signal for sporadic misfires or from the magnitude of signals derived from said feature signal; and, drawing a conclusion as to the affected cylinder from said phase angle.

6. The method of claim 1, comprising the further step of subsequently extinguishing misfires recognized from crossovers between the normal class and recurring misfire classes.

7. A method for detecting combustion misfires in an internal combustion engine on the basis of a first complex input feature signal defined by a magnitude and phase angle which vary as a function of time, said engine having a crankshaft and the method comprising:

defining the nonuniformity of the rotational movement of said engine on the basis of rpm or segment times;

mapping said nonuniformity within a first order defined by a rotation of said crankshaft through an angle of 720°/k wherein k=1;

forming a reference signal via lowpass filtering;

utilizing said reference signal as a feature signal to detect recurring misfires;

determining the difference between said input feature signal and said reference signal; and, utilizing said difference to form a feature to detect sporadic misfires.

8. The method of claim 7, comprising the further steps of drawing a conclusion as to a recurring misfire from said magnitude and drawing a conclusion as to the affected cylinder from said phase angle.

9. The method of claim 7, further comprising the step of forming a derived signal to detect sporadic misfires from said feature signal to detect sporadic misfires by forming a mean value within a moving window; and, setting the derived signal to zero when the value of said signal within said window exceeds a specific spacing to said mean value.

10. The method of claim 7, wherein said feature signal for sporadic misfires or a signal derived therefrom can only represent a sporadic misfire when the phase angle of said signal does not move out of a region assigned to the actual firing cylinder (phase angle discrimination).

11. The method of claim 7, comprising the further steps of drawing a conclusion as to the occurrence of combustion misfires from the magnitude of said feature signal for sporadic misfires or from the magnitude of signals derived from said feature signal; and, drawing a conclusion as to the affected cylinder from said phase angle.

12. The method of claim 7, comprising the further step of subsequently extinguishing misfires recognized from crossovers between the normal class and recurring misfire classes.

13. A method for detecting combustion misfires in an internal combustion engine on the basis of a first complex input feature signal defined by a magnitude and phase angle which vary as a function of time, said engine having a crankshaft and the method comprising:

defining the nonuniformity of the rotational movement of said crankshaft of said engine on the basis of rpm or segment times;

mapping said nonuniformity within a first order defined by a rotation of said crankshaft through an angle of 720°/k wherein k=1;

forming a reference signal via nonlinear lowpass filtering;

utilizing said reference signal as a feature signal to detect recurring misfires;

determining the difference between said input feature signal and said reference signal; and, utilizing said difference to form a feature to detect sporadic misfires.

14. The method of claim 13, wherein said reference signal corresponds to the lowpass filtered input signal when there are small signal changes of said input feature signal; and, said reference signal is frozen when there are large signal changes until small signal changes occur again.

15. The method of claim 13, comprising the further steps of drawing a conclusion as to a recurring misfire from said magnitude and drawing a conclusion as to the affected cylinder from said phase angle.

16. The method of claim 13, further comprising the step of forming a derived signal to detect sporadic misfires from said feature signal to detect sporadic misfires by forming a mean value within a moving window; and, setting the derived signal to zero when the value of said signal within said window exceeds a specific spacing to said mean value.

17. The method of claim 13, wherein said feature signal for sporadic misfires or a signal derived therefrom can only represent a sporadic misfire when the phase angle of said signal does not move out of a region assigned to the actual firing cylinder (phase angle discrimination).

18. The method of claim 13, comprising the further steps of drawing a conclusion as to the occurrence of combustion misfires from the magnitude of said feature signal for sporadic misfires or from the magnitude of signals derived from said feature signal; and, drawing a conclusion as to the affected cylinder from said phase.

19. The method of claim 13, comprising the further step of subsequently extinguishing misfires recognized from crossovers between the normal class and recurring misfire classes.

* * * * *

UNITED STATES PATENT AND TRADEMARK OFFICE
CERTIFICATE OF CORRECTION

PATENT NO. : 5,821,411
DATED : October 13, 1998
INVENTOR(S) : Andrea Lohmann, Klaus Ries-Mueller and Juergen Foerster It is certified that error appears in the above-identified patent and that said Letters Patent is hereby corrected as shown below:

In column 2, line 50: after "input" add -- feature signal operating as a feature signal to detect recurring misfires and as a feature signal to detect sporadic misfires; and, the first complex input signal being defined by a magnitude and a phase angle which vary as a function of time. --.

Signed and Sealed this

Seventeenth Day of August, 1999

Attest:

Q. TODD DICKINSON

*Attesting Officer*       *Acting Commissioner of Patents and Trademarks*